US008324867B2

(12) United States Patent
Chen et al.

(10) Patent No.: US 8,324,867 B2
(45) Date of Patent: Dec. 4, 2012

(54) PROTECTION STRUCTURE FOR BATTERY CHARGING

(75) Inventors: Chien-Heng Chen, Taipei Hsien (TW); Chung-Hsin Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 319 days.

(21) Appl. No.: 12/856,648

(22) Filed: Aug. 14, 2010

(65) Prior Publication Data
US 2011/0304303 A1 Dec. 15, 2011

(30) Foreign Application Priority Data
Jun. 10, 2010 (CN) .......................... 2010 1 0197116

(51) Int. Cl.
*H02J 7/00* (2006.01)
*H02J 7/04* (2006.01)
(52) U.S. Cl. .......................... 320/134; 320/136; 320/150
(58) Field of Classification Search .................. 320/134, 320/136, 150
See application file for complete search history.

(56) References Cited

U.S. PATENT DOCUMENTS

| | | | |
|---|---|---|---|
| 6,630,815 B2 * | 10/2003 | Hanafusa et al. | 320/150 |
| 8,093,867 B2 * | 1/2012 | Sato et al. | 320/152 |
| 2010/0194346 A1 * | 8/2010 | Lee et al. | 320/134 |

* cited by examiner

Primary Examiner — M'Baye Diao
(74) Attorney, Agent, or Firm — Altis Law Group, Inc.

(57) ABSTRACT

A protection structure includes a temperature sensing module, a processing module, and a charging control module. The temperature sensing module senses the temperature of a battery and outputs electronic signals. The processing module receives the electronic signals and outputs a first control signal group. The charging control module receives the electronic signals and the first control signal group, compares the electronic signals with a first reference range, and outputs a second control signal group according to the comparison results. When the second control signal group and the first control signal group both include a charging signal or a stop-charging signal, the executing module controls the battery to charge or stop the battery from charging according to the first control signal group.

13 Claims, 2 Drawing Sheets

PROTECTION STRUCTURE FOR BATTERY CHARGING

BACKGROUND

1. Technical Field

The disclosure relates to batteries, and particularly, to a protection structure for battery charging.

2. Description of Related Art

A typical lithium battery used in a portable electronic device such as a mobile phone or a laptop computer, often includes a protection circuit for charging. Generally, the protection circuit includes a thermal resistor, a microprocessor, and a charging control sub-circuit connected to the microprocessor. The thermal resistor senses the battery's temperature when in charging, the microprocessor controls the sub-circuit to charge according to the sensed temperature. If the temperature is higher than a reference value, the microprocessor can control the sub-circuit to stop charging to protect the battery from being over-charged. However, the microprocessor may malfunction at times, and the battery cannot be charged safely.

Therefore, it is desirable to provide a battery protection structure, which can overcome the problems described above.

DETAILED DESCRIPTION

Figure 1:
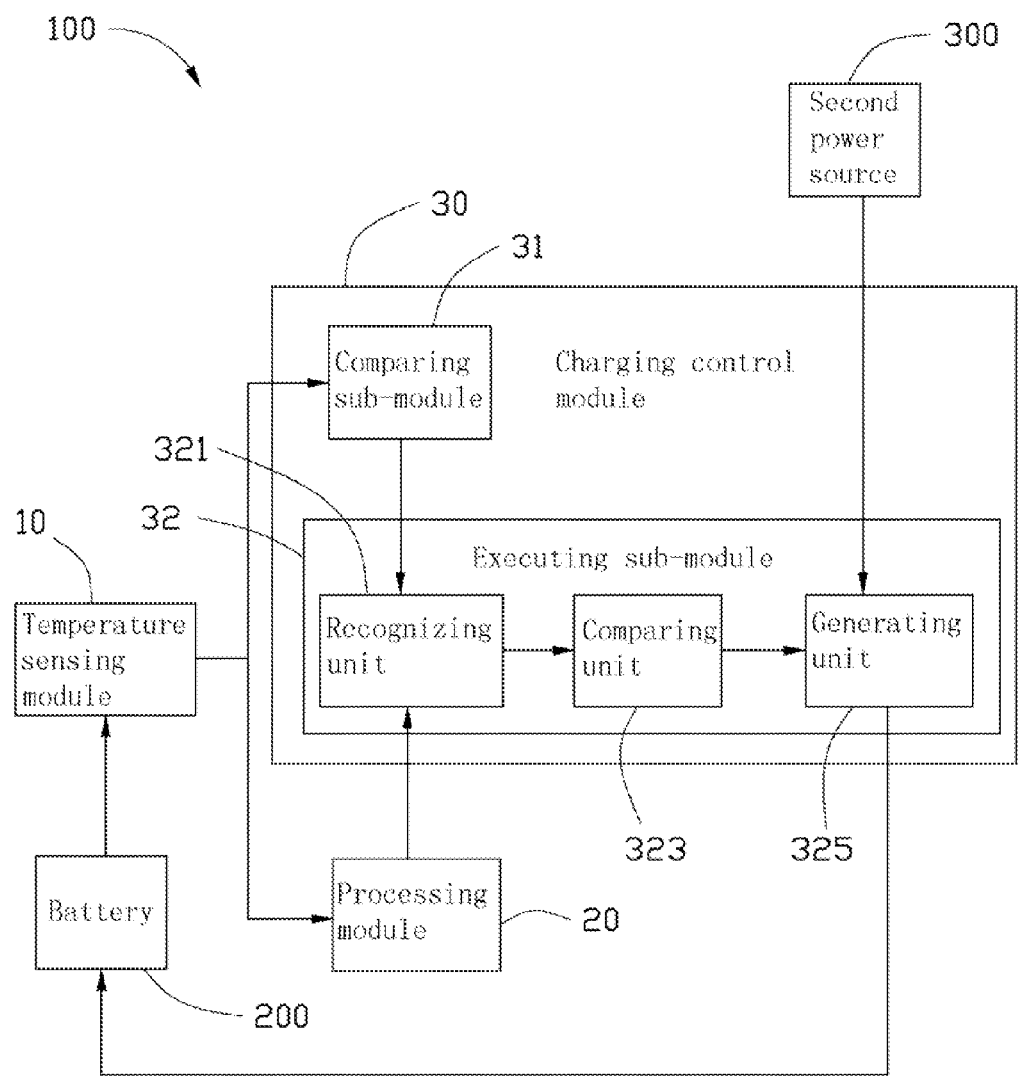
FIG. 1 is a functional block diagram of a battery protection structure, according to an exemplary embodiment.
Figure 2:
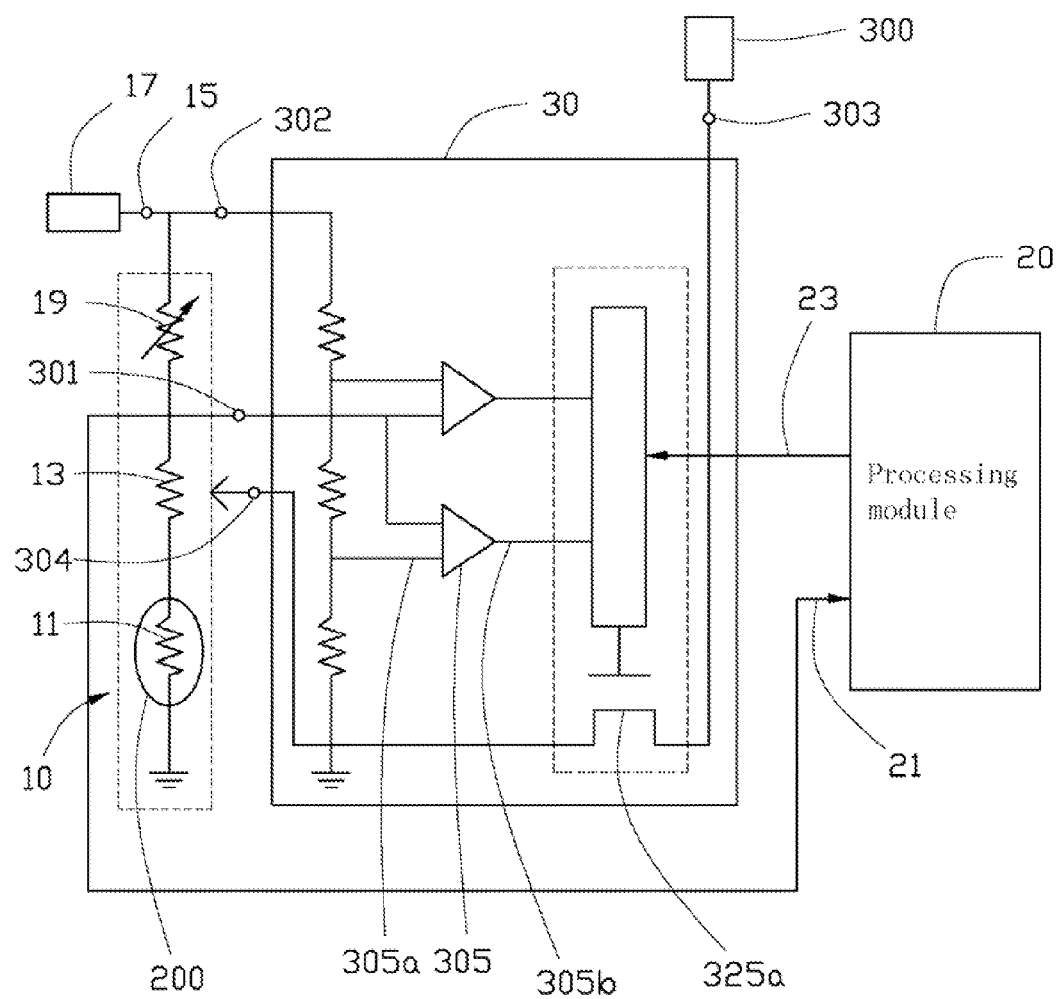
FIG. 2 is a circuit diagram of the battery protection structure of FIG. 1.

Referring to FIGS. 1 and 2, a protection structure 100 for battery charging includes a temperature sensing module 10, a processing module 20, and a charging control module 30. The temperature sensing module 10 is configured for sensing the temperature of a battery 200 when charging, and further converting the temperature values into electronic signals. The processing module 20 is configured for receiving the electronic signals from the temperature sensing module 10 and outputting a first control signal group according to the values of the electronic signals. The charging control module 30 includes a comparing sub-module 31 and an executing sub-module 32. The comparing sub-module 31 is configured for receiving the electronic signals from the temperature sensing module 10 and outputting a second control signal group according to the electronic signals. The executing sub-module 32 is configured for recognizing and comparing the first control signal group with the second control signal group. The executing sub-module 32 further controls the battery 200 to charge or stop charging according to the first control signal group, when the second control signal group is consistent with the first control signal group. The executing sub-module 32 also controls the battery 200 to charge or stop charging according to the second control signal group, when the second control signal group is opposite to the first control signal group.

In detail, the temperature sensing module 10 includes a thermal sensor 11 embedded in or attached to the battery 200. The thermal sensor 11 can sense the current temperature of the battery 200 and output the electronic signals corresponding to the current temperature. In the present embodiment, the electronic signal is a voltage.

The processing module 20 is connected to the temperature sensing module 10 and continuously receives the electronic signals from the temperature sensing module 10. The processing module 20 predetermines a number of first reference ranges corresponding to the electronic signals and is configured for judging the relationship between the first reference ranges and the electronic signals. For example, the processing module 20 can predetermine one range from about 2V to about 5V corresponding to the output of a charging signal, another range from about 3V to about 4V corresponding to the output of a charging signal with constant current, and another range lower than about 2V and higher than about 5V to output a stop-charging signal. If the value of the electronic signal is about 3.5 V, the processing module 20 confirms that the electronic signal is fallen in the range of about 3V to about 4V, and outputs a first control signal group including a constant current charging signal to the charging control module 30.

The comparing sub-module 31 is connected to the temperature sensing module 10 and also continuously receives the electronic signals from the temperature sensing module 10. The comparing sub-module 31 predetermines a second reference range and is configured for judging the relationship between the second reference range and the electronic signals. For example, the comparing sub-module 31 can predetermine a second reference range from about 3V to about 5V. If the values of the electronic signals are fallen in the second reference range, the second control signal group should include a charging signal. If the values of the electronic signals are out of the first reference range, the second control signal group should include a stop-charging signal.

The executing sub-module 32 includes but is not limited to a recognizing unit 321, a comparing unit 323, and a generating unit 325.

The recognizing unit 321 is configured for recognizing and converting the second control signal group and the first control signal group to be readable in same form characters. In the present embodiment, when the recognizing unit 321 recognizes the first control signal group including a charging signal, a character "001" is output. When the recognizing unit 321 recognizes the first control signal group including a stop-charging signal, a character "000" is output. When the recognizing unit 321 recognizes the first control signal group including a constant current charging signal, a character "011" is output. When the recognizing unit 321 recognizes the second control signal group including a charging signal, a character "1" is output. When the recognizing unit 321 recognizes the second control signal group including a stop-charging signal, a character "0" is output. It is understood that the form of the readable character cannot be limited in digital form as described above.

The comparing unit 323 is configured for comparing the output characters corresponding to the second control signal group with the output characters corresponding to the first control signal group, and judging whether the first and second control signal group both include a charging signal or a stop-charging signal. In the present embodiment, the comparing unit 323 compares the end character of the first control signal with the primary character of the second control signal. If the end character of the first control signal is the same as the primary character of the second control signal, the comparing unit 323 confirms that the first and second control signal group are consistent with each other and outputs an "enable" signal to the generating unit 325. If the end character of the first control signal is different from the primary character of the second control signal, the comparing unit 323 judges that the first and second control signal group are opposite to each other and outputs a "disable" signal to the generating unit 325.

The "enable" signal to show that the processing module 20 is in an enabled state while the "disable" signal shows that the processing module 20 is in a disabled state for the following reasons: the processing module 20 is a semiconductor chip for running a program while the comparing sub-module 31 is a hardware circuit. As a result, compared to the comparing sub-module 31, the processing module 20 is easier to shut down due to an error message from the program. As such, when the second control signal output from the processing module 20 has the opposite result as the first control signal output from the comparing sub-module 31, the processing module 20 is considered to have malfunctioned. Therefore, it is reasonable to judge the "enable" or "disable" state of the processing module 20 according to the comparison results from the comparing unit 323.

The generating unit 325 is configured for charging the battery 200 or stop charging according to the first control signal while the comparing unit 323 outputs "enable" signal, and for charging or stop charging according to the second control signal while the comparing unit 323 outputs a "disable" signal.

Referring to FIG. 2, a circuit diagram of the battery protection structure 100 for charging the battery 200 is shown. The temperature sensing module 10 further includes a constant resistor 13 connected to one end of the thermal resistor 11 in series. The other end of the thermal resistor 11 is grounded. The other end of the constant resistor 13 is connected to the charging control module 30, the processing module 20, and a reference end 15 at the same time. The reference end 15 is connected to a first power source 17 for receiving a constant voltage drop. In the present embodiment, the constant voltage drop is about 3.3V. An adjustable resistor 19 is connected to a node between the reference end 15 and the constant resistor 13. As such, the output voltage of the temperature sensing module 10 is changeable with the temperature changing and equal to the sum of the voltage dropped on the constant resistor 13 and the thermal resistor 11.

The charging control module 30 includes a detecting terminal 301, a first input terminal 302 for inputting the reference voltage, a second input terminal 303 for inputting the voltage drop from a second power source 300, a first output terminal 304 for outputting the voltage drop from the second power source 300 to the battery 200, and two comparators 305. Each comparator 305 includes two third input terminals 305a and a second output terminal 305b. The detecting terminal 301 connects the constant resistor 13 to one of the third input terminals 305a of each comparator 305. The first input terminal 302 connects the reference end 15 to the other third input terminal 305a of each comparator 305.

The generating unit 325 includes at least one field effective transistor 325a (FET). The second output terminal 305b is connected to the gate of the FET 325a via the recognizing unit 321 and the comparing unit 323. The second input terminal 303 connects the source of the FET 325a to the second power source 300. The first output terminal 304 connects the drain of the FET 325a to the battery 200.

The processing module 20 includes a fourth input terminal 21 and a third output terminal 23. The fourth input terminal 21 is connected to a node between the constant resistor 13 and the adjustable resistor 19 for receiving the output from the thermal sensor 11. The third output terminal 23 is connected to the recognizing unit 321 for outputting the first control signal group thereto.

When the comparator 305 receives the electronic signals from the temperature sensing module 10 and the second reference range from the first input terminal 302, the comparator 305 compares the second reference range and the electronic signals. If the electronic signals are included in the second reference range, the second output terminal 305b outputs the second control signal group including charging signal. If the electronic signals are out of the second reference range, the second output terminal 305b outputs the second control signal group, which includes stop-charging signal, to the recognizing unit 321. Simultaneously, the fourth input terminal 21 of the processing module 20 receives the electronic signals from the temperature sensing module 10, and the processing module 20 judges the corresponding relationship between the first reference ranges and the electronic signals, and outputs the corresponding first control signal group from the third output terminal 23 to the recognizing unit 321. The recognizing unit 321 recognizes the second control signal group and the first control signal group, and further outputs both groups to the comparing unit 323. The comparing unit 323 compares the first and second control signal group and outputs a corresponding result as describe above. In this case, even the processing module 20 has malfunctioned, the battery 200 is controlled by the second control signal group and will not be overcharged.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A protection structure for battery charging, comprising:
   a temperature sensing module configured for sensing the temperature of a battery in charging and converting the temperature into electronic signals;
   a processing module configured for receiving the electronic signals from the temperature sensing module and outputting a first control signal group according to the values of the electronic signals; and
   a charging control module comprising:
      a comparing sub-module configured for receiving the electronic signals and outputting a second control signal group according to the values of the electronic signals; and
      an executing sub-module configured for receiving the first control signal group and the second control signal group, recognizing and comparing the second control signal group with the first control signal group, wherein when the second control signal group is consistent with the first control signal group, the executing sub-module controls the battery to charge or stop charging according to the first control signal group, when the second control signal group is opposite to the first control signal group, the executing sub-module controls the battery to charge or stop charge according to the second control signal group.

2. The protection structure of claim 1, wherein the processing module predetermines a plurality of first reference ranges corresponding to the electronic signals and is configured for outputting the first control signal group according to the relationship between the first reference ranges and the electronic signals.

3. The protection structure of claim 1, wherein when the comparing sub-module judges that the electronic signals fall in a predetermined second reference range, the second control signal group comprises a charging signal, when the comparing sub-module judges that the electronic signals are out of the second reference range, the second control signal group comprises a stop-charging signal.

4. The protection structure of claim 1, wherein the executing sub-module comprises a recognizing unit, a comparing unit and a generating unit, the recognizing unit is configured for recognizing and converting the second control signal group and the first control signal group to be readable characters; the comparing unit is configured for comparing the recognized second control signal group with the recognized first control signal group, and judging if the first and first control signal group both comprising a charging signal or a stop-charging signal; the generating unit is configured for generating the battery to be charged or stop charging according to the comparison results from the comparing unit.

5. The protection structure of claim 4, wherein the comparing unit compares the end character of the first control signal with the primary character of the second control signal, if the end character of the first control signal is the same as the primary character of the second control signal, the comparing unit outputs an "enable" signal to the generating unit; if the primary character of the first control signal is different from the end character of the second control signal, the comparing unit outputs a "disable" signal to the generating unit.

6. The protection structure of claim 5, wherein the generating unit is configured for charging the battery or stopping charge according to the first control signal while the comparing unit outputs "enable" signal, and further configured for charging or stopping charge according to the second control signal while the comparing unit outputs "disable" signal.

7. The protection structure of claim 1, wherein the temperature sensing module comprises a thermal sensor embedded in or attached to the battery and a constant resistor connected to one end of the thermal resistor, the other end of the thermal resistor is grounded, the other end of the constant resistor is connected to the charging control module, the processing module and a reference end simultaneously.

8. The protection structure of claim 7, wherein the reference end is connected to a first power source for receiving a constant voltage drop, and an adjustable resistor is connected between the reference end and the constant resistor.

9. The protection structure of claim 8, wherein the charging control module comprises a detecting terminal, a first input terminal for inputting the reference voltage, a second input terminal for inputting the voltage drop from a second power source, and a first output terminal for outputting the voltage drop from the second power source.

10. The protection structure of claim 9, wherein the charging control module further comprises two comparators, each comparator comprises two third input terminals and a second output terminal, the detecting terminal connects the other end of the constant resistor to one third input terminal of each comparator, the first input terminal connects the reference end to the other third input terminal of each comparator.

11. The protection structure of claim 9, wherein the executing sub-module comprises at least one field effective transistor (FET), the second output terminal is connected to the gate of the FET, the second input terminal is connected the source of the FET to the second power source, the first output terminal is connected the drain of the FET to the battery.

12. The protection structure of claim 11, wherein the processing module comprises a fourth input terminal and a third output terminal, the fourth input terminal is connected to a node between the constant resistor and the adjustable resistor for receiving the output from the temperature sensing module, the third output terminal is connected to the recognizing unit for outputting the first control signal group thereto.

13. A protection structure for battery charging, comprising:
a temperature sensing module configured for sensing the temperature of a battery in charging and converting the temperature into electronic signals;
a processing module configured for receiving the electronic signals from the temperature sensing module and outputting a first control signal group according to the values of the electronic signals;
a comparing sub-module configured for receiving the electronic signals and outputting a second control signal group according to the values of the electronic signals; and
an executing sub-module configured for receiving the first control signal group and the second control signal group, recognizing and comparing the second control signal group with the first control signal group;
wherein, when the second control signal group is consistent with the first control signal group, the executing sub-module controls the battery to charge or stop charging according to the first control signal group, when the second control signal group is opposite to the first control signal group, the executing sub-module controls the battery to charge or stop charge according to the second control signal group.

* * * * *